(12) United States Patent
Kapiloff et al.

(10) Patent No.: US 9,657,513 B1
(45) Date of Patent: May 23, 2017

(54) SHATTER-RESISTANT, OPTICALLY-TRANSPARENT PANELS AND METHODS OF USE OF THE PANELS FOR ON-SITE RETROFITTING AND REINFORCING OF PASSAGEWAYS

(71) Applicants: Christopher Kapiloff, Williamstown, MA (US); Jeffrey Besse, Pittsfield, MA (US)

(72) Inventors: Christopher Kapiloff, Williamstown, MA (US); Jeffrey Besse, Pittsfield, MA (US)

( * ) Notice: Subject to any disclaimer, the term of this patent is extended or adjusted under 35 U.S.C. 154(b) by 0 days.

(21) Appl. No.: 15/179,007

(22) Filed: Jun. 10, 2016

Related U.S. Application Data

(63) Continuation-in-part of application No. 14/710,048, filed on May 12, 2015, now Pat. No. 9,365,015.

(60) Provisional application No. 61/992,065, filed on May 12, 2014.

(51) Int. Cl.
| | |
|---|---|
| *E06B 3/00* | (2006.01) |
| *E06B 5/10* | (2006.01) |
| *E06B 3/56* | (2006.01) |
| *E06B 3/02* | (2006.01) |
| *E06B 3/54* | (2006.01) |
| *B32B 17/10* | (2006.01) |

(52) U.S. Cl.
CPC .......... *E06B 5/10* (2013.01); *B32B 17/10036* (2013.01); *B32B 17/1077* (2013.01); *B32B 17/10752* (2013.01); *E06B 3/02* (2013.01); *E06B 3/549* (2013.01); *E06B 3/5454* (2013.01); *E06B 3/56* (2013.01); *B32B 2307/412* (2013.01); *B32B 2607/00* (2013.01); *E06B 2003/5472* (2013.01)

(58) Field of Classification Search
CPC .......... E06B 5/10; E06B 3/549; E06B 3/5454; E06B 3/02; E06B 3/56; E06B 2003/5472; B32B 17/10036; B32B 17/1077; B32B 17/10752; B32B 2307/412; B32B 2607/00
USPC ............ 52/204.5, 204.591, 204.593, 204.67; 156/102
See application file for complete search history.

(56) References Cited

U.S. PATENT DOCUMENTS

| | | | | |
|---|---|---|---|---|
| 2,808,355 | A * | 10/1957 | Christie | ............ B32B 17/10036 156/108 |
| 3,919,022 | A * | 11/1975 | Stefanik | ............ B32B 17/10293 156/104 |
| 3,930,452 | A * | 1/1976 | Van Laethem | ... B32B 17/10045 109/49.5 |
| 4,004,388 | A * | 1/1977 | Stefanik | ............ B32B 17/10293 244/121 |

(Continued)

*Primary Examiner* — Basil Katcheves
(74) *Attorney, Agent, or Firm* — Malcolm J. Chisholm, Jr.

(57) ABSTRACT

The disclosure includes multi-layered panels (10, 60, 204) including exterior layers of glass (12, 44) and interior layers of urethane (20, 36) and at least one layer of polycarbonate (16) between the urethane layers (20, 36) that result in enhanced shatter resistance within panels (10, 60, 204) that weigh between about 4.1 and 4.6 pounds per square foot. The panels (10, 60, 204) include an insertion tab (23, 61, 23") of the polycarbonate layer (16) that enhances performance of the panel (10). Reinforced passageways (70, 200, 300) such as doors and windows of schools, hospitals and other public and private buildings, are disclosed using the multi-layered panel (10, 60, 204) with the insertion tab (23, 61, 23").

8 Claims, 8 Drawing Sheets

(56) References Cited

U.S. PATENT DOCUMENTS

| | | | | |
|---|---|---|---|---|
| 4,149,348 | A | * | 4/1979 | Pyzewski ............ E06B 3/66366 156/109 |
| 4,164,361 | A | * | 8/1979 | Grimble ................ A47F 3/0434 312/116 |
| 4,933,227 | A | * | 6/1990 | Stewart ............. B32B 17/10018 156/102 |
| 5,326,606 | A | | 7/1994 | Labock |
| 5,531,500 | A | | 7/1996 | Podvin |
| 5,937,611 | A | * | 8/1999 | Howes .............. B32B 17/10036 156/99 |
| 7,334,371 | B2 | * | 2/2008 | Rinehart ........... B32B 17/10036 52/204.593 |
| 7,681,369 | B2 | * | 3/2010 | Soltesiz ................ E06B 3/6604 52/204.593 |
| 7,681,485 | B2 | | 3/2010 | Neal |
| 8,898,966 | B2 | | 12/2014 | Bar |
| 9,157,703 | B2 | | 10/2015 | Thompson |
| 2009/0217813 | A1 | * | 9/2009 | Carberry ........... B32B 17/10036 89/36.02 |

\* cited by examiner

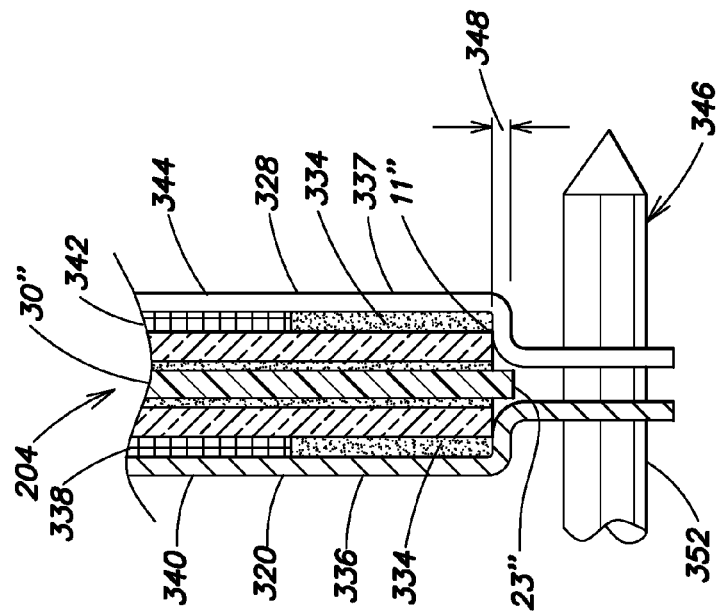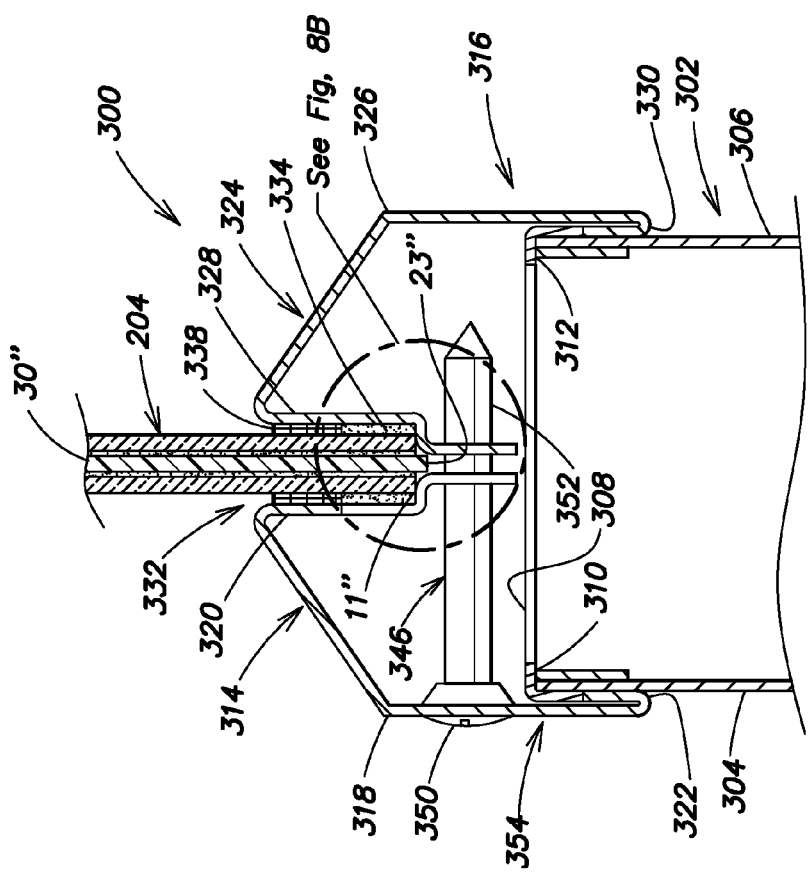

SHATTER-RESISTANT, OPTICALLY-TRANSPARENT PANELS AND METHODS OF USE OF THE PANELS FOR ON-SITE RETROFITTING AND REINFORCING OF PASSAGEWAYS

CROSS-REFERENCE TO RELATED APPLICATIONS

This application is a continuation-in-part U.S. patent application Ser. No. 14/710,048 entitled "Shatter-Resistant, Optically-Transparent Panels and Methods of Use of the Panels for On-Site Retrofitting and Reinforcing of Passageways" that was filed on May 12, 2015, and is now U.S. Pat. No. 9,365,015 that issued on Jun. 14, 2016, and that application Ser. No. 14/710,048 claims the benefit of U.S. Provisional Patent Application Ser. No. 61/992,065 that was filed on May 12, 2014 entitled "Shatter-Resistant, Optically-Transparent Panels and Methods of Use of the Panels for On-Site Retrofitting and Reinforcing of Passageways".

TECHNICAL FIELD

This disclosure relates to shatter-resistant, optically-transparent panels for use in glass passageways, such as doors or windows, to enhance security of the doors and/or windows. The disclosure also relates to a method of on-site retrofitting of the shatter-resistant, optically-transparent panels into existing door frames while simultaneously reinforcing the door frames.

BACKGROUND ART

It is well known that doorways to public buildings, such as schools, courthouses, etc., present security challenges in preventing unwanted persons from entering through the doors. In a tragic example of a security failure of a common school door, on Dec. 14, 2012, an armed intruder shattered a front door of the Sandy Hook Elementary School in Newtown, Conn., U.S.A. and proceeded to shoot and kill 26 unarmed civilians. The front door of the Sandy Hook Elementary School was only tempered glass that shattered and collapsed upon impact with one bullet fired by the intruder from a gun so that the intruder could then walk through the door into the school.

Many efforts have been made to improve intrusion resistance of glass doors of public and private buildings. For buildings housing high-value persons and or museum-type goods, it is well known to use thick, bullet-proof types of layered glass. For example, U.S. Pat. No. 7,641,965 that issued on Jan. 5, 2010 to Bennison et al. and that is owned by E. I. du Pond de Nemours and Company, shows a multi-layered optically-transparent, ballistic resistant "safety glazing" or window. The Bennison et al. "safety glazing" has an impact zone at one surface, such as an exterior surface of a window of an armored vehicle, and an anti-spall surface to prevent fragments of the window from breaking off and impacting persons within the armored vehicle. In one embodiment, Bennison et al., shows windows having between five and eleven layers. While effective, such a complex window is both prohibitively expensive and too heavy to be utilized in common doorways of public buildings, such as public schools, courthouses, university buildings, hospitals, etc.

More recently, U.S. Pat. No. 7,857,605 that issued on Jan. 11, 2011 to Moran et al. shows an intrusion resistant glass laminate for use between two layers of glass to provide enhanced stiffness without loss of optical clarity. Moran et al. discloses stiffness factors that result in resistance to increasing numbers of axe-head impacts, 19.5 Kg. pendulum impacts, blunt head impacts (for car windshields) and other intrusion risks. Again, while thick, stiff safety glazed, transparent panels provide protection, they generally weigh in excess of 20 pounds per square feet, and hence cannot be efficiently utilized in existing doorways of public buildings.

Consequently, there is a need for a light-weight, shatter-resistant, transparent panel that can be efficiently retrofitted into existing doorways at a minimum cost while providing substantially enhanced resistance to shattering to thereby provide a secure doorway.

SUMMARY OF THE DISCLOSURE

The disclosure is a shatter-resistant, optically-transparent panel for resisting breaking of the panel into pieces. The disclosure includes two embodiments of the panel; a first thin embodiment, and a second thick embodiment. The disclosure also includes a method of using either the thin or thick embodiment to perform an on-site retrofitting and reinforcing of a traditional passageway such as a door or a window secured within a building, such as a school, hospital, etc.

The thin embodiment includes a first layer; being a glass sheet having an exterior surface and an opposed interior surface, the first glass sheet having a thickness of about 3.048 millimeters [0.12"]; a second layer being a first urethane sheet having an upper surface secured adjacent the interior surface of the first glass sheet and having a lower surface, the first urethane sheet having a thickness of about 0.635 millimeters [0.025]; a third layer being a polycarbonate sheet having an upper surface secured adjacent the lower surface of the first urethane sheet and having a lower surface, the polycarbonate sheet having a thickness of about 2.997 millimeters [0.118"]; a fourth layer being a second urethane sheet having an upper surface secured adjacent the lower surface of the polycarbonate sheet and having a lower surface, the second urethane sheet having a thickness of about 0.635 millimeters [0.025]; and, a fifth layer being a second glass sheet having an interior surface secured adjacent the lower surface of the second urethane sheet and having an exterior surface, the second glass sheet having a thickness of about 3.048 millimeters [0.120"]. The total thickness of the thin embodiment is about 10.363 millimeters ("mm") [0.408"].

The thick embodiment is similar to the thin embodiment but has seven total layers having an additional urethane coated polycarbonate sheet. The seven layers include a first layer being a first glass sheet having an exterior surface and an opposed interior surface, the first glass sheet having a thickness of about 3.048 millimeters [0.12"]; a second layer being a first urethane sheet having an upper surface secured adjacent the interior surface of the first glass sheet and having lower surface, the first urethane sheet having a thickness of about 1.270 millimeters [0.050"]a third layer being a first polycarbonate sheet having an upper surface secured adjacent the lower surface of the first urethane sheet and having a lower surface, the first polycarbonate sheet having a thickness of about 2.997 millimeters [0.118"]; a fourth layer being a second urethane sheet having an upper surface secured adjacent the lower surface of the first polycarbonate sheet and having a lower surface, the second urethane sheet having a thickness of about 0.381 millimeters [0.015"]; a fifth, layer being a second polycarbonate sheet having an upper surface secured adjacent the lower surface of the second urethane sheet and having a lower surface, the second polycarbonate sheet having a thickness of about 0.762 millimeters [0.030"]; sixth layer being a third urethane sheet having an upper surface secured adjacent the lower surface of the second polycarbonate sheet and having a lower surface, the third urethane sheet having a thickness of about 1.270 millimeters [0.050"]; and, a seventh layer being a second glass sheet having an interior surface secured adjacent the lower surface of the third urethane sheet and having an exterior surface, the second glass sheet and having a thickness of about 3.048 millimeters [0.120"]. The total thickness of the thick embodiment is about 11.760 millimeters [0.463"].

For purposes herein, the word "about" is to mean plus or minus twenty-percent. Additionally, the opposed surfaces or the described object.

Both the thin and thick embodiments of the panel may be configured so each of the five or seven layers are disposed to overlie adjacent layers and each of the five or seven layers are configured to be co-extensive with each other so that each layer has a perimeter edge overlying a perimeter edge of an adjacent layer.

Additionally, both the thin and thick embodiments of the panels may include the polycarbonate sheet of the thin embodiment, or the first and thickest polycarbonate sheet of the thick embodiment, overlying adjacent sheets and having at least a portion or all of perimeter edges of the polycarbonate sheets define an insertion tab extending beyond the perimeter edges of the other sheets of the panels.

The disclosure includes a method of on-site retrofitting an reinforcing a passageway with a shatter-resistant, optically-transparent panel. The method includes removing exterior stops surrounding an exterior surface of the passageway between a passageway frame and glass to be replaced; then, removing the glass to be replaced. Weather stripping is then taken off of the removed exterior stops and from the interior stops that remain surrounding the passageway frame. To reinforce the existing passageway frame and the exterior and interior stops, the interior stops are first drilled and metal screws counter sunk into the interior stops and the metal screws pass through the interior stops and into the passageway frame at least 13 mm [about 0.5 inches] and every 304 mm [12 inches] on-center starting at a center of each stop. A minimum of three screws are required for each stop unless the stop is less than 304 mm [12 inches] in length. The metal screws are flat headed screws, and are not smaller than a size 8 screw. (For purpose herein, "size 8 screw" is to mean that a diameter of the threaded shaft of the screw is about 4.1656 mm [0.1640 inches].) After the interior stops are thereby reinforced, the exterior stops are reinserted into the passageway frame, and then reinforced in the same manner as the interior stops as described above. The reinforcing screws the exterior stops are positioned so that the screws in the exterior stops are aligned with the screws in the interior stops.

After reinforcing the stops, the exterior stops are removed, and then a 3.048 mm [0.120 (⅛) inch] bead of a blast proof caulking is applied at a base of the interior stop and the passageway frame surrounding an entire perimeter of the passageway frame. The blast proof caulking may be caulking known as "Dow Corning 995 Structural Glazing Bomb Blast Silicone Sealant" that is commonly available. Then, the method includes installing either the thin or thick embodiment of the shatter-resistant, optically-transparent panel into the passageway frame adjacent the bead of caulking.

Next, a 3.048 mm [0.120 (⅛) inch] bead of the blast proof caulking is applied along an entire exterior perimeter of the selected panel where the panel meets the passageway frame. The exterior stops are then installed so that holes drilled in the stops align with holes drilled in the passageway frame. Finally, a bead that is than 3.048 mm [0.120 (⅛) inch] of the blast proof caulking is applied within a gap between the exterior surface of the selected panel and the exterior stops, and is also applied within a gap between the interior surface of the selected panel and the interior stops.

An additional embodiment includes a first reinforced passageway, such as a door or a window, etc. The first reinforced passageway includes the passageway having a frame surrounding a transparent panel. The frame includes a first structural surface, an opposed second structural surface and a top structural surface secured perpendicular to and extending between top edges of the first and second structural surfaces.

More specifically, the first reinforced passageway includes an integral first stop and base plate wherein the base plate is secured adjacent to and parallel with the top structural surface. An outside wall of the first stop is secured to the base plate and adjacent the top edge of the first structural surface. The outside wall extends in parallel association with and away from the first structural surface. An inside wall of the first stop is secured to the base plate and is opposed to the outside wall. The inside wall extends in parallel association with the outside wall away from the base plate and top structural surface. The base plate also includes a plate extension that extends along the top structural surface in a direction away from the outside and inside walls of the first stop. A first fastener passes through the base plate extension to fasten the integral first stop and base plate to the top structural surface.

A bead of blast proof caulking is secured over the first fastener between and along the base plate extension and along a lower portion of the inside wall of the first stop. A first layer of glazing tape is secured to an upper portion of the inside wall. The glazing tape extends from adjacent the bead of blast proof caulking along the inside wall parallel to the bead, and the glazing tape also extends to cover the upper portion of the inside wall. A setting block is secured within the bead of blast proof caulking and adjacent the base plate extension.

The optically-transparent panel is secured within the bead of blast proof caulking upon the setting block, and is also secured adjacent the layer of glazing tape. The optically-transparent panel may be either the above described thin embodiment or the thick embodiment of the transparent panel. For purpose of efficiency, the aforesaid thin and thick embodiments of the transparent panel are also described as a shatter-resistant five-layer thin panel or a shatter-resistant seven-layer thick panel, wherein each of the panels includes opposed first and second glass sheets, first and second urethane sheets between the first and second glass sheets, and a polycarbonate sheet between the urethane sheets. The transparent panel has a weight no greater than about 4.6 pounds per square foot, and the polycarbonate sheet defines an insertion tab extending beyond a common perimeter edge defined by the glass sheets and the urethane sheets overlying each other. The optically-transparent panel is cured to the integral first stop and base plate so that the insertion tab is adjacent the setting block.

The first embodiment of the reinforced passageway also includes a second stop having an outside wall of the second stop that is secured to the top structural surface and is also secured adjacent the top edge of the second structural surface. The outside wall of the second stop extends in parallel association with and away from the second structural surface. The second stop also includes an inside wall of the second stop that is also secured to the top structural surface and is opposed to the outside wall. The inside wall extends in parallel association with the outside wall away from the top structural surface. A second fastener passes through a top surface of the second stop between the inside and outside walls of the second stop and through the top structural surface of the frame to secure the second stop to the top structural surface of the frame. A second layer of glazing tape is secured to an upper portion of the inside wall of second stop. The second layer of glazing tape extends along the inside wall of the second stop adjacent the transparent panel, and the tape extends along the inside wall of the second stop to cover the upper portion of the inside wall of the second stop. The first and second layers of glazing tape cooperate to prevent the optically-transparent layer from contacting metal material forming the first and second stops.

In an additional aspect of the first reinforced passageway, the insertion tab extends away from the common perimeter edge a distance of about one-sixteenth of an inch.

In another aspect of the first reinforced passageaway, the shatter-resistant, optically-transparent panel is configured so that an entire perimeter edge of the polycarbonate sheet defines the insertion tab so that the insertion tab of the polycarbonate sheet extends beyond the entire common perimeter edge.

In a further aspect of the first reinforced passageway, the outside wall of the second stop and the second structural surface form part of an interior side of the reinforced passageway. By "interior side" it is meant that the passageway is part of an enclosed structure, having and "inside volume" enclosed by walls, a roof and passageways, etc. The "interior side" is a surface of the reinforced passageway facing the inside volume of the enclosed structure. Keeping the second fastener of the second stop in the interior of the enclosed structure prevents an unwanted intruder from unfastening the second stop to mechanically remove the shatter-proof, optically-transparent panel.

Yet another embodiment is a second reinforced passageway, such as a door or a window, etc., that substantially improves two-piece kits known in the art to secure transparent panels to frames. The second reinforced passageway includes a frame surrounding the transparent panel. The frame includes a first structural surface, an opposed second structural surface and a top structural surface secured perpendicular to and extending between top edges of the first and second structural surfaces.

More particularly, the second reinforced passageway includes, a first piece of a two-piece transparent panel mounting kit. The first piece has a first wall secured adjacent the top edge of the first structural surface, and the first wall extends a pre-determined distance away from the first structural surface and the top structural surface. The first wall also includes a first cavity wall extending back toward the top structural surface. The first wall also includes a first grab-cleat that extends below the top edge of the first structural surface and is secured adjacent the first structural surface. The second embodiment of the reinforced passageway also includes a second piece of the two-piece transparent panel mounting kit. The second piece has a second wall secured adjacent the top edge of the second structural surface and the second wall extends a pre-determined distance away from the second structural surface and the top structural surface. The second wall also includes a second cavity wall that extends toward the top structural surface. The second wall also includes a second grab-cleat that extends below the top edge of the second structural surface and is secured adjacent the second structural surface. The first cavity wall and the second cavity wall are configured to define a panel mounting cavity between the cavity walls. A bead of blast proof caulking is secured within the mounting cavity between the cavity walls and adjacent lower portions of the first and second cavity walls. A first layer of glazing tape is secured along an upper portion of the first cavity wall. A second layer of glazing tape is secured along an upper portion of the second cavity wall.

The optically-transparent panel is secured within the mounting cavity, within the bead of blast proof caulking in the mounting cavity, and between and adjacent the first and second layers of glazing tape on the first and second cavity walls. The optically-transparent panel is a shatter-resistant five-layer thin panel or a shatter-resistant seven-layer thick panel, as described above. Each of the panels includes opposed first and second glass sheets, first and second urethane sheets between the first and second glass sheets, and a polycarbonate sheet between the urethane sheets. The transparent panel has a weight no greater than about 4.6 pounds per square foot. Additionally, the polycarbonate sheet defines an insertion tab extending beyond a common perimeter edge defined by the glass sheets and the urethane sheets overlying each other. The optically-transparent panel is secured within the mounting cavity so that the insertion tab is closer to the top structural surface than the common perimeter edge. A kit-fastener passes through the first and second piece of the two-piece transparent panel mounting kit, and the kit-fastener and two pieces of the kit are configured so that the kit-fastener selectively draws the two pieces toward each other to thereby decrease a volume within the mounting cavity to secure the optically-transparent panel within the mounting cavity of the two-piece kit.

In another aspect of the second reinforced passageway, the insertion tab extends away from the common perimeter edge a distance of about one-sixteenth of an inch.

In an additional aspect of the second reinforced passageway, an entire perimeter edge of the polycarbonate sheet defines the insertion tab so that the insertion tab of the polycarbonate sheet extends beyond the entire common perimeter edge.

In a further aspect of the second reinforced passageway, the kit-fastener comprises a metal screw having a driving head and threaded body wherein the driving head is secured adjacent one of the first and second pieces of the two-piece kit. The piece with the driving head of the metal screw forms part of an interior side of the reinforced passageway.

Testing by the inventors has established an enormous increase in shatter-resistance of the described panels that provides dramatically enhanced security for persons within an interior of a building protected by the passageways, such as doors and windows, retrofitted with the thin or thick embodiments of the present disclosure. Prior efforts to obtain anywhere near the same level intrusion resistance necessarily included complete removal of the passageway frame and replacement with a frame that can support bullet-proof or intrusion resistant glass weighing typically more than 25 pounds per square foot, which is a very costly and time-consuming undertaking. In contrast, the panels of the present thin and thick embodiments weigh between about 4.1 pounds and 4.6 pounds per square foot, and hence can be easily supported by standard door passageway frames and hardware configured to support standard glass panels commonly utilized in public school buildings.

Again, the present invention, especially the embodiments of the thin and thick panels that include the extending polycarbonate layers having the extending insertion tabs, have been successfully tested to withstand extraordinary intrusion efforts. In one test, more than five bullets from a Hungarian made "AK-47" rifle firing 7.62 mm rounds defined a semi-circle of penetration through a thick embodiment of the panel within a standard school door frame. The semi-circle of holes was around a lock access and positioned in an effort to permit the shooter to knock out or shatter a section of the panel around a hand actuated interior lock of the door. The panel did not fail. Then, a two-hundred pounds plus male swung a baseball bat at the semi-circle as hard as he could for over fifty strikes. The panel did not fail. Instead, the door frame failed, leading the inventors herein to develop the above-described passageway frame reinforcing system integrated with the on-site retrofitting system.

The inventors have concluded that their present disclosure presents extraordinary benefits in efficiently and quickly enhancing the security of public schools especially, and other public and private buildings. In light of the tragedy of the Newtown Conn. massacre described above, the present disclosure provides an immeasurable value for the security of children and others faced with the terror of unrestrained violence.

Accordingly, it is a primary purpose of the present disclosure to provide a shatter-proof optically resistant panel for resisting breaking of the panel into pieces and an efficient, inexpensive method of using the panels for on-site retrofitting and reinforcing of passageways with the panels. These and other advantages purposes of the present disclosure will become apparent when the following description is read along with the accompanying drawings.

BRIEF DESCRIPTION OF THE DRAWINGS

FIG. 8A is a fragmentary, cross-sectional view of a second reinforced passageway embodiment of the present disclosure, showing a first piece of a two-piece kit secured by a kit-fastener to a second piece of the two-piece kit upon a top structural surface of the frame and showing a shatter-resistant, optically-transparent panel secured within a mounting cavity between the two-pieces.

FIG. 8B is an expanded view of a circled portion of FIG. 8A showing the optically-transparent passel within the mounting cavity with an insertion tab of the panel positioned closest to the top structural surface of the frame of the second reinforced passageway.

PREFERRED EMBODIMENTS OF THE DISCLOSURE

Figure 1:
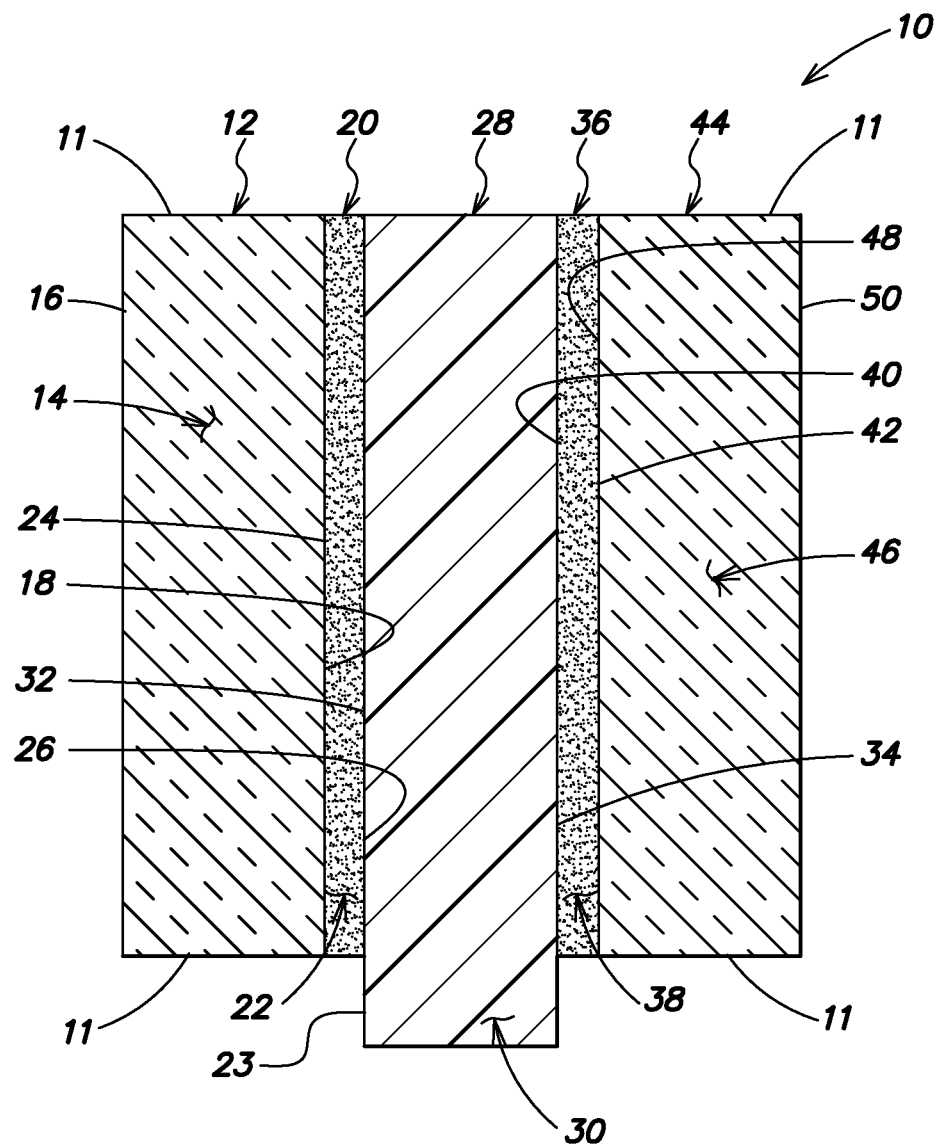
FIG. 1 is cross-sectional, fragmentary, schematic view of a thin embodiment of a shatter-resistant, optically-transparent panel constructed in accordance with the present disclosure.

Referring to the drawings in detail, a thin panel embodiment of a shatter-resistant, optically-transparent panel is shown in a cross-sectional, fragmentary and simplified view in FIG. 1 and is generally designated by the reference numeral 10. The thin panel embodiment 10 includes first layer 12 that includes a first glass sheet 14 having an exterior surface 16 and an opposed interior surface 18. The first glass sheet 14 has a thickness of about 3.048 millimeters [0.12"]. The thin embodiment 10 also includes second layer 20 made of a first urethane sheet 22 that has an upper surface 24 that secured adjacent the interior surface 18 of tine first glass sheet 14. The first urethane sheet 22 also has a lower surface 26 opposed to the upper surface 24. The first urethane sheet 22 has thickness of about 0.635 millimeters [0.025]. A third layer 28 is made of a polycarbonate sheet 30 that has an upper surface 32 secured adjacent the lower surface 26 of the first urethane sheet 22. The polycarbonate sheet 30 also has a lower surface 34, and the polycarbonate sheet 30 has a thickness of about 2.997 millimeters [0.118"].

The thin panel embodiment 10 also has a fourth layer 36 made of a second urethane sheet 38 having an upper surface 40 secured adjacent the lower surface 34 of the polycarbonate sheet 30, and also having a lower surface 42. The second urethane sheet 38 has a thickness of about 0.635 millimeters [0.025"]. The thin embodiment 10 also has a fifth outer layer 44 made of a second glass sheet 46 which has an interior surface 48 secured adjacent the lower surface 42 of the second urethane sheet 38. The second glass sheet 46 also has an exterior surface 50, and the thickness of the second glass sheet 46 is about 3.046 millimeters [0.120"].

As recited above, for purposes herein, the word "about" is to mean plus or minus twenty-percent. Additionally, the word "thickness" is to mean a shortest distance between opposed surfaces or the described object.

It is to be understood that the word "urethane" as used herein to identify the two urethane sheets 22, 38 includes "polyurethane" and other polymers composed of a chain of organic units joined by carbamate (urethane) links. The purpose of the urethane layers 22, 38 in the present invention is to facilitate bonding of the extremely hard polycarbonate sheet 30 to the exterior glass layers 14, 46, and to provide elasticity that prevents cracking of any of the hard layers of the thin panel 10 when exposed to thermal stresses. Any other compound known to achieve that goal and that is known in the intrusion-resistant, bullet-proof panel arts may be used with or instead of the urethane layers and be within the scope of the present disclosure. Similarly, the word "polycarbonate" is to mean any polymer containing carbonate groups (—O—(C=O)—O—). An exemplary polycarbonate is sold under the trademark "LEXAN" and is commonly available from a SABIC Innovative Plastics company (formerly General Electric Plastics), of Pittsfield, Mass., United States of America.

Figure 2:
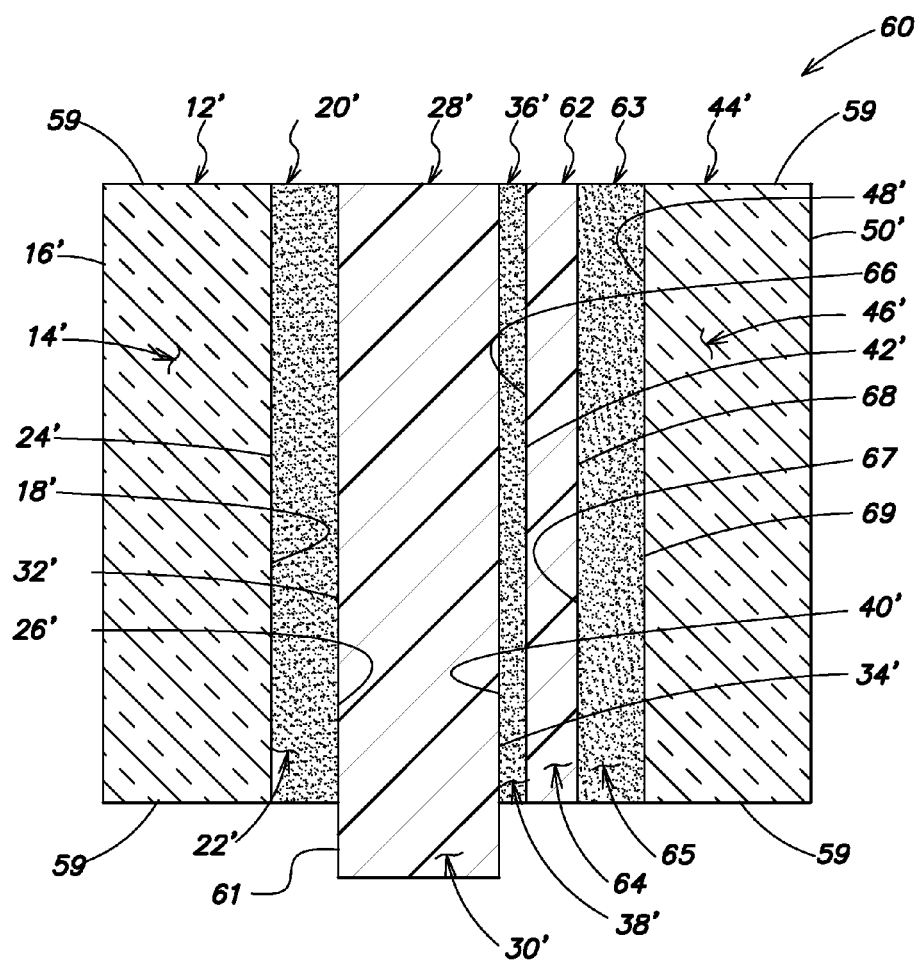
FIG. 2 is a cross-sectional fragmentary, schematic view of a thick embodiment of a shatter-resistant, optically-transparent panel constructed in accordance with the present disclosure.

FIG. 2 shows a schematic, fragmentary embodiment of a thick panel embodiment 60 of the present shatter-proof, optically-transparent panel and is generally designated by the reference numeral 60. The thick panel embodiment 60 includes five layers that are very similar to the five layers of the above-described thin panel embodiment, and also includes two additional layers. For purposes of efficiency and ease of explanation, the layers of the thick panel embodiment 60 that are very similar to the layers described above for the thin panel embodiment 10 will be associated with primes of the reference numerals for the FIG. 1, thin panel embodiment 10. For example, the first layer of the thin panel embodiment 10 is associated with the reference numeral 12, and the first layer of the thick panel embodiment 60 will be associated with the reference numeral 12'.

The thick embodiment 60 include a first layer 12' made of a first glass sheet 14', and it has an exterior surface 16' and an opposed interior surface 18'. The first glass sheet 14' has a thickness of about 3.048 millimeters [0.12"]. The thick panel embodiment 60 also includes second layer 20' made of a first urethane sheet 22' that has an upper surface 24' secured adjacent the interior surface 18' of the first glass sheet 14'. The first urethane sheet 22' also has a lower surface 26', and the first urethane sheet 22' of the thick panel embodiment has a thickness of about 1.270 millimeters [0.050"]. The thick panel embodiment 60 also includes a third layer 28' made of a first polycarbonate sheet 30' that has an upper surface 32' secured adjacent the lower surface 26' of the first urethane sheet 22' and has a lower surface 34'. The first polycarbonate sheet 30' of the thick panel 60 has a thickness of about 2.997 millimeters [0.118"]. A fourth layer 36' is made of a second urethane sheet 38', and it has an upper surface 40' that is secured adjacent the lower surface 34' of the first polycarbonate sheet 30', and it also a lower surface 42'. The second urethane sheet 38' of the thick panel 60 has a thickness of about 0.381 millimeters [0.015"].

The thick panel embodiment 60 includes a different fifth layer than the thin panel embodiment 10, and hence will not be represented by prime reference numerals and will be referred to as a fifth non-outer layer 62. The fifth non-outer layer is made of a second polycarbonate sheet 64 having an upper surface 66 secured adjacent the lower surface 42' of the second urethane sheet 38' and having a lower surface 68. The second polycarbonate sheet 64 has a thickness of about 0.762 millimeters [0.030"]. The thick panel 60 also has a sixth layer 63 that is made of a third urethane sheet 65 having an upper surface 67 secured adjacent the lower surface 68 of the second polycarbonate sheet 64. The third urethane sheet 65 also has a lower surface 69, and the third urethane sheet has a thickness of about 1.270 millimeters [0.050"]. The thick panel embodiment 60 also has an outer seventh layer which very similar to the fifth outer layer 44 of the thin embodiment 10. Therefore, components of the seventh outer layer of the thick embodiment 60 will be associated prime reference numerals of the fifth outer layer 44 of the thin embodiment 10. The seventh outer layer 44' is made of a second glass sheet 46' having an interior surface 48' secured adjacent the lower surface 69 of the third urethane sheet 65 and having an exterior surface 50', the second glass sheet having a thickness of about 3.048 millimeters [0.120"].

FIG. 1 also shows that the thin panel embodiment 10 defines a common perimeter edge 11 which is a farthest planer extension of all of the five layers 12, 20, 28, 36, 44 making up the thin panel embodiment 10. The five layers making up the thin panel 10 all share the common perimeter edge 11 so that all five layers overlie each other to define the common perimeter edge 11. However, a portion of the third layer 28 made of the first polycarbonate sheet 30 may define an insertion tab 23 that extends beyond the common perimeter edge 11. The insertion tab 23 may be one tab 23 that extends coextensively with the entire perimeter edge 11 of the panel 10, or the insertion tab 23 may be one of many insertion tabs 23 defined at predetermined locations along the perimeter edge 11 to help secure the panel 10 within a place of use of the panel 10, such as shown in FIG. 3.

Similarly, the FIG. 2 shows that the thick panel embodiment 60 defines a perimeter edge 59 which is a farthest planer extension of all of the seven layers 12', 20', 28', 36', 62, 63, 44' making up the thick panel embodiment 60. The seven layers making up the thick panel embodiment 60 all share the common perimeter edge 59 so that all seven layers overlie each other to define the common perimeter edge 59. However, a portion of the third layer 28' made of the first polycarbonate sheet 30' may define a second insertion tab 61 that extends beyond the common perimeter edge 59. The second insertion tab 61 may be one tab 61 that extends coextensively with the entire perimeter edge 59 of the panel 60, or the second insertion tab 61 may be one of many second insertion tabs 61 defined at predetermined locations along the perimeter edge 59 to help secure the panel 60 within a place of use of the panel 60 (shown in subsequent FIGS.).

Figure 3:
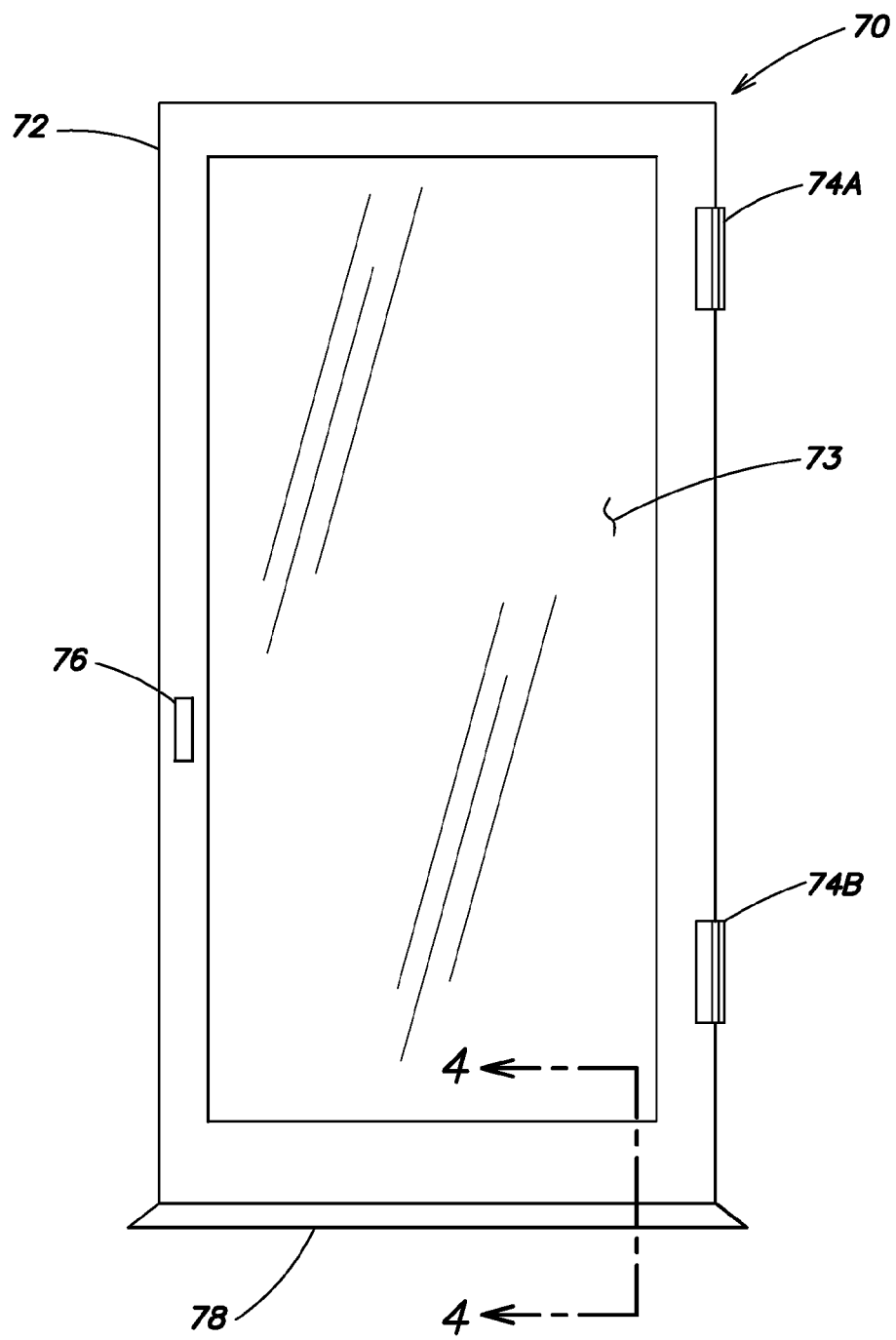
FIG. 3 is simplified front plan view of a door passageway within which a shatter-resistant, optically-transparent panel constructed in accordance with the present disclosure may be secured.

FIG. 3 is a simplified front plan view of a door passageway 70. The passageway includes a surrounding frame 72 for securing and supporting a shatter-resistant, optically-transparent panel 73 constructed in accordance with the present disclosure. The door passageaway 70 may also include standard hinges 74A, 74B for hinging the door 70 into a building opening (not shown), and a standard door latch 76 for opening the door 70. Additionally, FIG. 3 shows the door passageway upon a standard sill 78 below the door 70.

Figure 4:
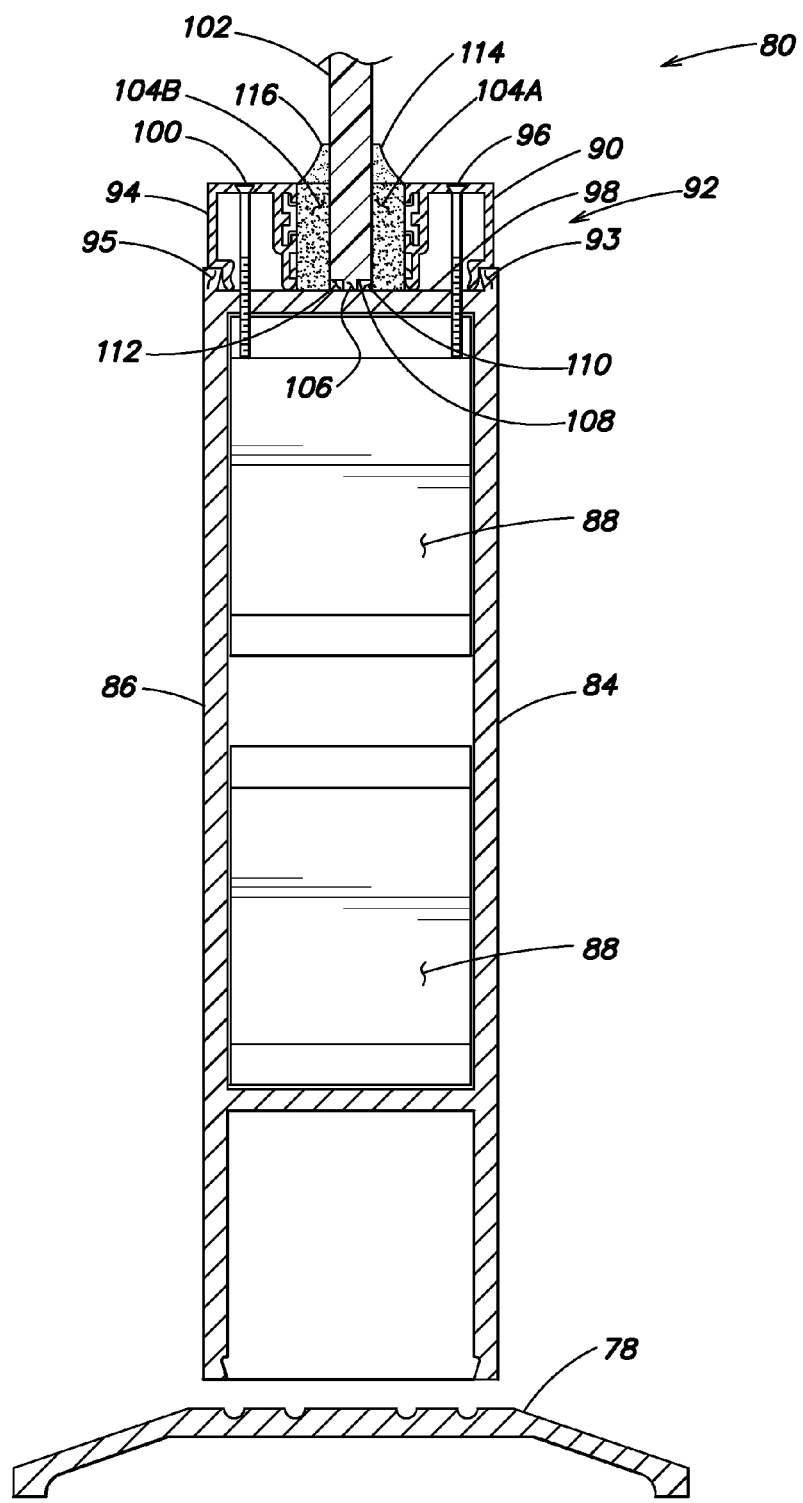
FIG. 4 is a fragmentary, cross-sectional view of a portion of the FIG. 3 door passageway taken along view line 4-4 of FIG. 3, and showing a frame of the door passageway reinforced by insertion of a shatter-resistant, optically-transparent panel constructed in accordance with the present disclosure.

FIG. 4 is a fragmentary, cross-sectional view of a portion of the FIG. 3 door passageway 70 taken along view line 4-4 of FIG. 3. FIG. 4 shows a lower section 80 of the door passageway 70 of FIG. 3. The lower section 80 is positioned above the sill 78 within a passageway over which a person would walk to pass through the passageway 70. The lower section 80 includes an interior structural surface 84 and an opposed exterior structural surface 86 having ordinary metal door structural support components 88 between the structural surfaces 84, 86. An interior stop 90 is shown secured within a door-frame compression receiver 92. The door-frame compression receiver 92 includes an interior grab-clip 93, and an opposed exterior grab-clip 95 at opposed outer edges of a top surface 98 of the compression receiver 92. The top surface 98 serves both a base 98 of the compression receiver 92 as well as a top structural surface 98 of the lower section 80 of the frame 72 of the door. An exterior stop 94 is shown at the opposed exterior surface 86, and is secured against the exterior grab-clip 95 of the compression receiver 92.

The interior stop 90 is shown having a reinforcing "No. 8 Metal Screw" 96 pack through the stop 90 and passing through the top surface 98 of the door-frame compression receiver 92, wherein the top surface 98 extends between top edges of the interior surface 84 and the exterior surface 86.

The phrase "No. 8 Metal Screw" is an exemplary fastener. However, any metal screw or fastener is acceptable if it is about at least as wide as a No. 8 screw and that will pass completely through the interior and exterior stops 90, 94 and through the top surface 98 of the door-frame compression receiver 92 a distance about as long as 25% of a vertical length of the interior and exterior stops 90, 94 and that is also parallel to the interior and exterior surfaces 84, 86. FIG. 4 shows that the exterior stop 94 also has a second reinforcing metal screw 100 passing through the stop interior 90 and into and through the top surface 98 of the door-frame compression receiver 92.

FIG. 4 also shows a section of a thin panel embodiment 102 of the present shatter-proof, optically-transparent panel 102 which is constructed as described above for the FIG. 1 thin panel embodiment 10. The FIG. 4 thin panel embodiment 102 is secured between the interior stop 90 and the exterior stop 94, and with a beads 104A, 104B of blast proof caulking secured between opposed sides of the panel 102 and the interior stop 90 and exterior stop 94. (As described above, the blast proof caulking may be caulking known as "Dow Corning 995 Structural Glazing Bomb Blast Silicone Sealant" that is commonly available. FIG. 4 also shows an insertion tab 106 of a polycarbonate layer (shown in FIG. 1 at ref. no. 30) extending below a perimeter edge 108 the panel 102 to contact the upper surface 98 of the door-frame compression receiver 92. Because the insertion tab 106 extends below the perimeter edge 108 of the panel 102, an interior pivot void 110 and an exterior pivot void 112 are defined on opposed sides of the insertion tab 106, between the upper surface 98 of the door-frame compression receiver 92 and the perimeter edge 108 of the panel 102. The pivot voids 110, 112 substantially enhance the resistance of the panel 102 to shattering upon an impact against either of the opposed exterior surfaces (shown in FIG. 1 at ref. nos. 16 and 50) because the insertion tab 106 may pivot into the pivot voids 110, 112 instead of being firmly clamped, with no room for movement in response to the impact. Repeated experiments demonstrated that the panel 102 exhibits much greater, shatter resistance through use of the insertion tab 106 compared to a panel (not shown) without the insertion tab 106, and this is most likely due to the pivot voids 110, 112. Additionally, the insertion tab 106 greatly enhances a bond between the panel 102, the interior and exterior stops 90, 94 and the upper surface 98 of the door-frame compression receiver 92. This disclosure includes a passageway 70 having the above described insertion tab 106 of the panel 10, 60 and the adjacent pivot voids 110, 112.

The present disclosure also includes a method of on-site retrofitting and reinforcing a passageway with a shatter-resistant, optically-transparent panel. By retro-fitting "on-site", the method does not require removal of the passageway, such as the FIG. 3 door passageway 70, from the location wherein the door 70 is being used. This is an enormous cost-savings. Otherwise, a temporary door (not shown) would have to be replace the door 70 for off-site reinforcement.

The method includes the steps of first removing the exterior stops 94 surrounding an exterior surface 86 of the door 70. The exterior 94 are located between the passageway 70 structural support frame 72 and glass (not shown) to be replaced. Then, the glass to be replaced is removed. Any weather stripping is then taken off of the removed exterior stops and from the interior stops 90 that remain surrounding the passageway frame 72. To reinforce the existing passageway frame 72 and the exterior and interior stops 94, 90, the interior stops 90 are first drilled and the above described interior metal screws 96 are counter sunk into the interior stops 90 and the metal screws pass through the interior stops 90 and into the top surface 98 of the passageway frame at least 13 mm [about 0.5 inches]. The interior screws 96 are positioned every 304 mm [12 inches] along the interior stop 90 on-center starting at a center of each interior stop 90. A minimum of three screws are required for each stop 90 unless the stop is less than 304 mm [12 inches] in length.

The metal screws 96 are flat headed screws, and are not smaller than a size 8 screw. (For purposes "size 8 screw" is to mean that a diameter of the threaded shaft of the screw is about 4.1656 mm [0.1640 inches].) After the interior stops 90 are hereby reinforced, the removed exterior stops 94 are reinserted into the frame 72 of the passageway 70, and then reinforced in the same manner as the interior screws 96 as described above, through insertion of the exterior metal screws 100. The reinforcing screws 100 of the exterior stops 94 are positioned so that the screws 100 in the exterior stops 94 are aligned with the screws 96 in the interior stops 90.

After reinforcing the 90, 94, the exterior stops 94 are removed, and then an interior bead 104A of about 3.048 mm [0.120 (⅛) inch] diameter of the blast proof caulking 104A is applied at a base of the interior stops 90 and the top surface 98 of the door frame compression receiver 92 so that the bead 104A surrounds an entire perimeter of the passageway frame 72. Then, the method includes installing one of the thin panel embodiment 10 and the thick panel embodiment 60 of the shatter-resistant, optically-transparent panel 10, 60 into the passageway frame 72 adjacent the bead 104A of caulking.

Next, another exterior 3.048 mm [0.120 (⅛) inch] bead 104B of the blast proof caulking is applied along an entire exterior perimeter of the selected panel 10, 60 where the panel 10, 60 meets the top surface 98 of the door frame compression receiver 92. The exterior stops 94 are then installed into the frame 72 so that holes drilled in the stops 94 align with holes drilled in the top surface 98 of the passageway frame 72. Finally, an interior supplemental bead 112 that is less than 3.048 mm [0.120 (⅛) inch] of the blast proof caulking is applied within any gap between the interior surface 50, 50' of the selected pane 10, 60 and the interior stops 90, and an exterior supplemental bead 114 may be applied within any gap between the exterior surface 16, 16' of the selected panel 10, 60 and the exterior stops 94. The door frame 72 is thereby substantially reinforced at the site of its usage, while the shatter-resistant transparent panels 10, 60 have also enormously increased the safety of the door 70. In many instances, the door 70 may be reinforced in the above manner without even removing it from its hinges 74A, 74b, to further reduce the cost of reinforcing the door 70 while replacing non-shatter resistant transparent panels (not shown).

Figure 5:
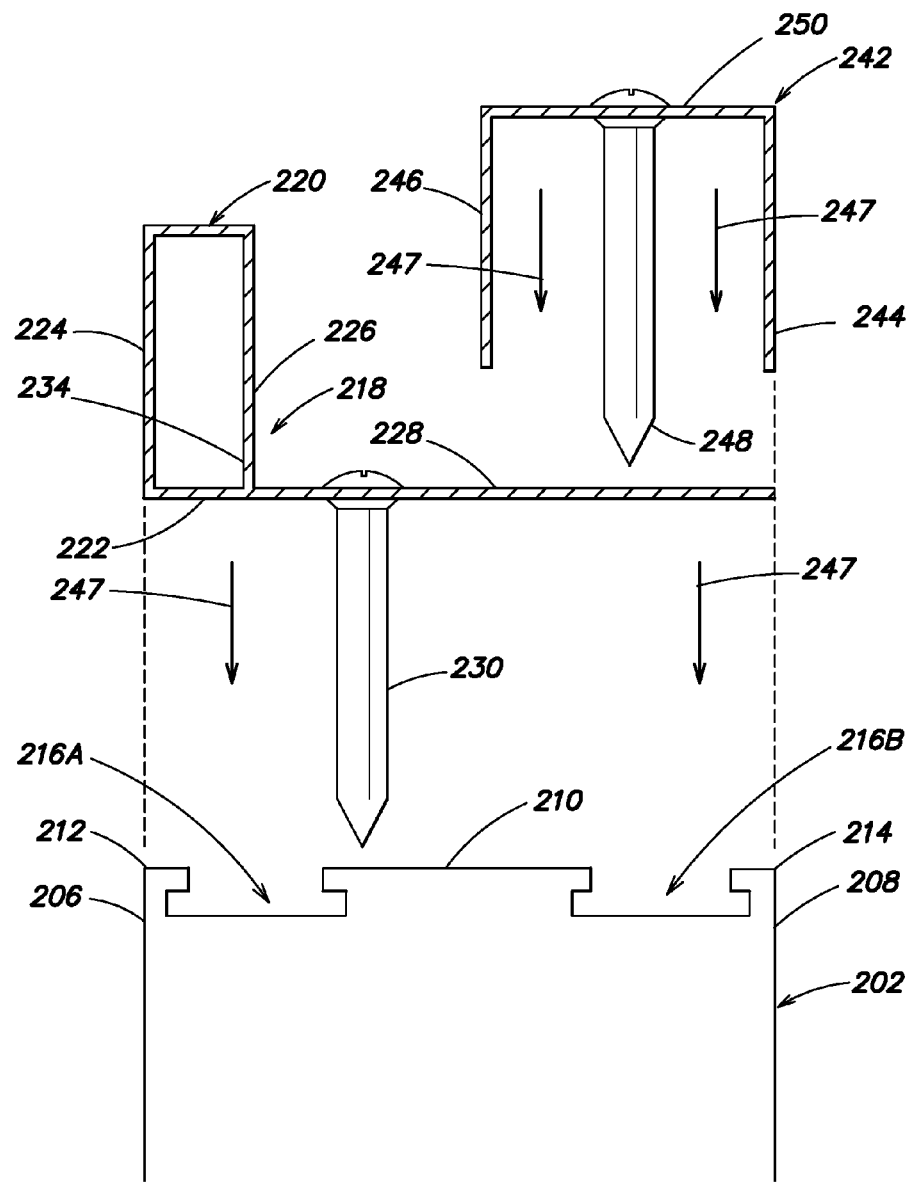
FIG. 5 is a fragmentary, cross-sectional view of a frame of a first reinforced passageway showing an integral first stop and base plate, showing a first fastener passing through a base plate extension, and showing a second fastener passing through a second stop.
Figure 6:
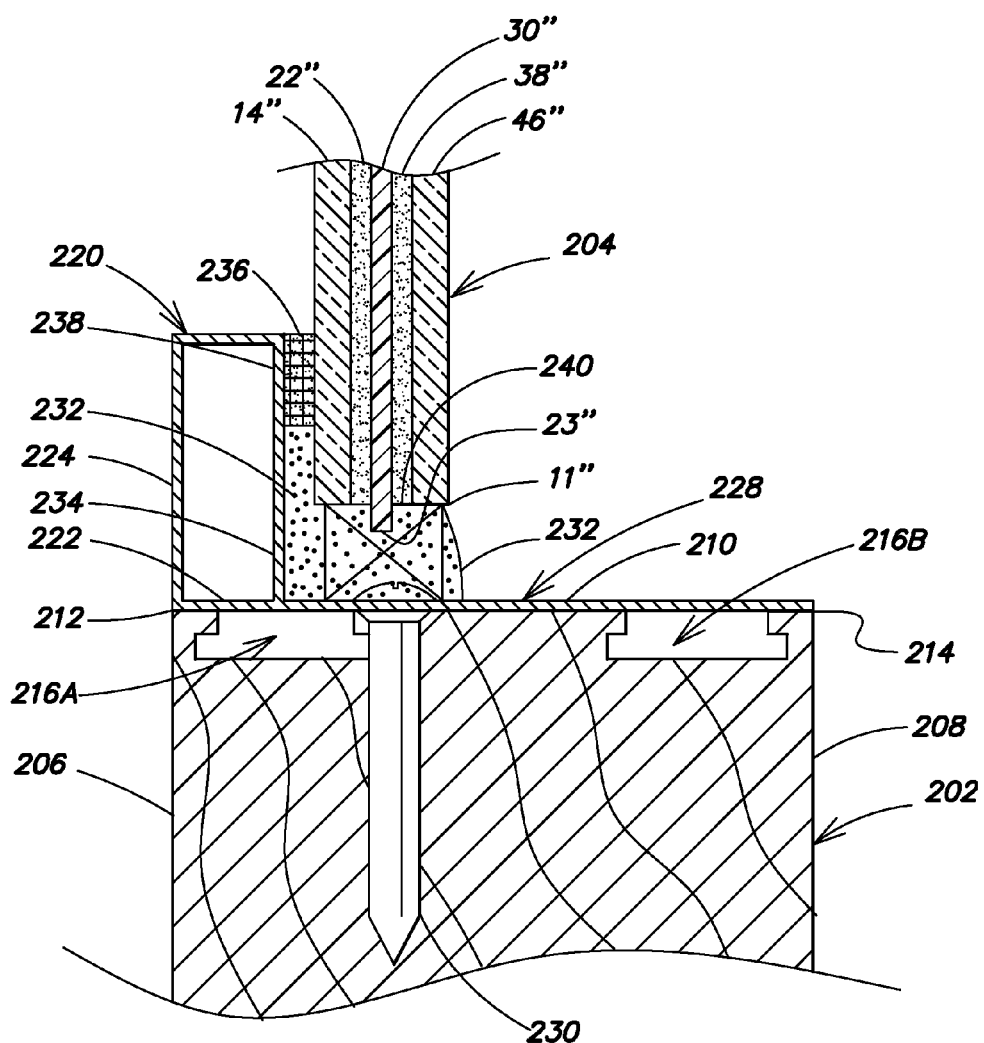
FIG. 6 is a fragmentary, cross-sectional view of the FIG. 5 frame, showing a bead of blast proof caulking between the base plate extension and an inside wall of the first stop, showing a first strip of glazing tape adjacent the bead of caulking and an upper portion of the inside wall, and showing a shatter-proof, optically-transparent panel seated upon a setting block within the bead of caulking.
Figure 7:
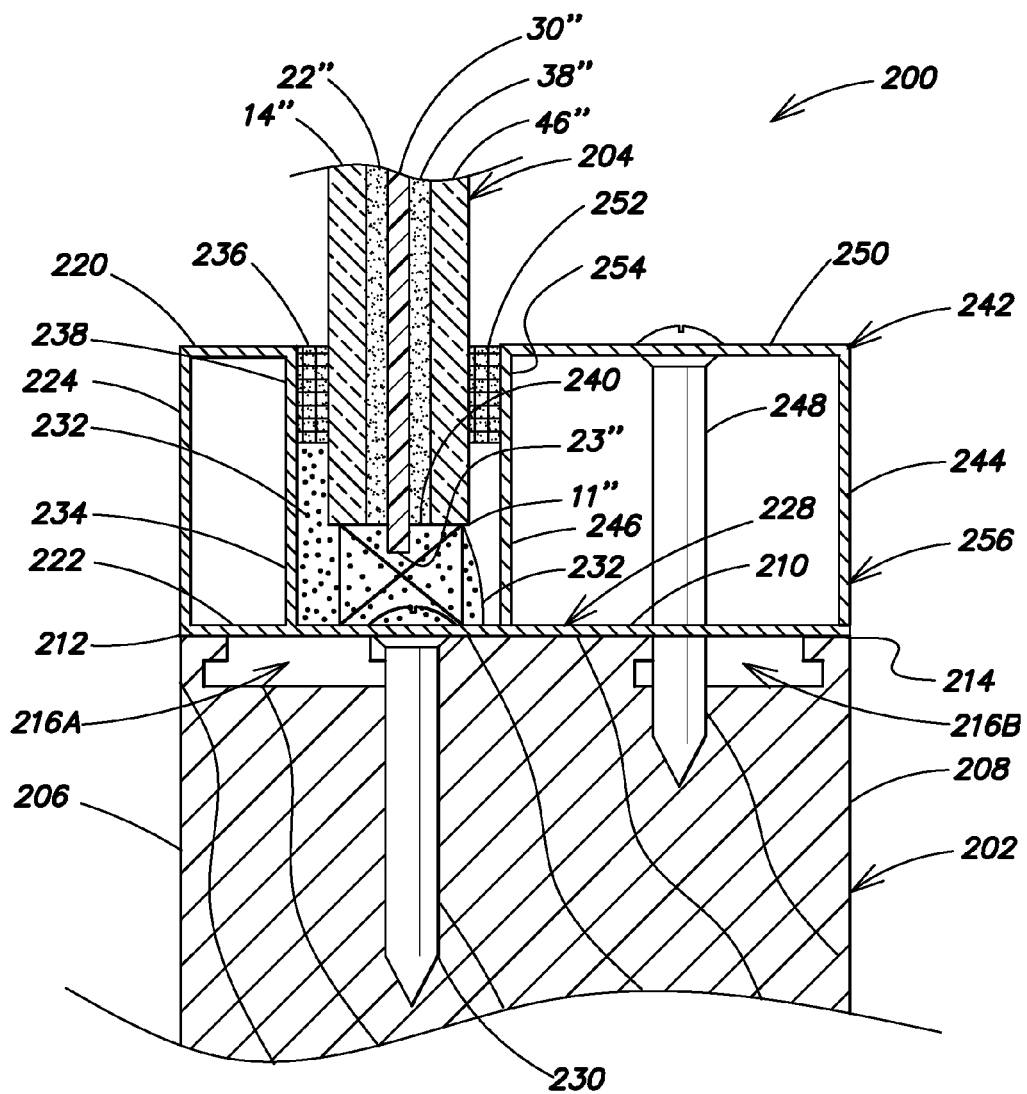
FIG. 7 is a fragmentary, cross-sectional view of the FIG. 6 frame, showing a second stop secured by a second fastener to a top structural surface of the frame, showing a second strip of glazing tape along an upper portion of an inside wall of the second stop, and showing the second strip of glazing tape adjacent the optically-transparent panel.

As best shown in FIG. 7, an additional embodiment of the present disclosure includes a first reinforced passageway that is shown in FIG. 7 in a fragmentary, cross-sectional view and is generally designated by the reference numeral 200. An entire first reinforced passageway (not shown) may be in the form of a door car a window, similar to the passageway 72 shown in FIG. 3. The first reinforced passageway 200 includes the passageway 200 having a frame 202 surrounding a transparent panel 204. The frame 202 includes a first structural surface 206, an opposed second structural surface 208 and a top structural surface 210 secured perpendicular to and extending between a top edge 212 of the first structural surface 206 and a top edge 214 of the second structural surface 208, as shown in FIGS 5-7. (The top structural surface 210 shown in FIGS. 5-7 includes empty stop sleeves 216A, 216B that have had conventional stops (not shown) removed, wherein the first reinforced passageway 200 is being retrofitted to a frame 202 previously used with conventional stops (not shown).)

More specifically, the first reinforced passageway 200 includes an integral first stop and base plate 218 that includes a box-like first stop 220 having a base plate 222 as a base of the first stop 220 and extending away from the first stop 220. The base plate 222 is secured adjacent to and parallel with the top structural surface 210. An outside wall 224 of the first stop 220 is secured to the base plate 222 and adjacent the top edge 212 of the first structural surface 206. The outside wall 224 extends in parallel association with and away from the first structural surface 206. An inside wall 226 of the first stop 220 is secured to the base plate 222 and is opposed to the outside wall 224. The inside wall 226 extends in parallel association with the outside wall 224 away from the base plate 222 and top structural surface 210. The base plate 222 also includes a plate extension 228 that extends along the top structural surface 210 in a direction away from the outside wall 224 and inside wall 226 of the first stop 220, as shown in FIGS. 5-7. A first fastener 230 passes through the base plate extension 228 to fasten the integral first stop and base plate to the top structural surface. It is noted that the base plate extension 228 is shown in FIGS. 5-7 as covering the entire top structural 210. However, the extension 228 need only extend away from the first stop 220 far enough to be able to have the first fastener 230 pass through the extension 228.

A bead of blast proof caulking 232 is secured over the first fastener 230 between and along the base plate extension 228 and along a lower portion 234 of the inside wall 226 of the first stop 220. A first layer of glazing tape 236 is secured to an upper portion 238 of the inside wall 226. The glazing tape 236 extends from adjacent the bead of blast proof caulking 232 along the inside wall 226 parallel to the bead 232, and the glazing tape 236 also extends to cover the upper portion 238 of the inside wall 226. A setting block 240 is secured within the bead of blast proof caulking 232 and adjacent the base plate extension 228.

The first layer of glazing tape 236, and other layers of glazing tape identified below, include "glazing tape" known in the transparent glass panel industry, such as a closed cell sealant made of closed cell polyvinyl chloride foam tape having a pressure sensitive adhesive on one or two exterior sides of the tape. Such a glazing tape is available from the Anemostat Door Products company of Carson, Calif. (see www.anemostat.com/DoorProducts/literature/tape.pdf).
Such glazing tapes have a limited range of compression and are available in thickness ranging generally between about one thirty-second of an inch (1/32") and about one-quarter of an inch (1/4"). Additionally, the setting block 240 may be any of a variety of "setting blocks" that are well-known in the transparent glass panel industry, such as santoprene setting blocks that are compatible with polycarbonate layers that are available from Reed Rubber Products, Inc. of Saint Louis, Mo. (See www.reedrubberproducts.com/glazing-neoprene-setting-blocks.html.)

The optically-transparent panel 204 is secured within the bead of blast proof caulking 232 upon the setting block 240, and is also secured adjacent the first layer of glazing tape 236. The optically-transparent panel may be either the above described thin embodiment of the transparent panel 10 (shown in FIG. 1) or the thick embodiment of the transparent panel 60 (shown in FIG. 2). For purpose of efficiency, the aforesaid thin 10 and thick 60 embodiments of the transparent panel are also described as shatter-resistant five-layer thin panel 10, 204 and a shatter-resistant seven-layer thick panel 60, wherein each of the panel includes opposed first and second glass sheets 14, 46, 14", 46" (layers of the thin embodiment 10 shown in FIGS. 6 and 7 for the five-layer thin panel 204 are show as double primes of the reference numerals shown in FIG. 1), first and second urethane sheets 22, 38, 22", 38" between the first and second glass sheets, and a polycarbonate sheet 30, 30" between the urethane sheets. The transparent panel 204 has a weight no greater than about 4.6 pounds per square foot, and the polycarbonate sheet 30" defines an insertion tab 23" extending beyond a common perimeter edge 11" defined by the glass sheets and the urethane sheets overlying each other. The optically-transparent transparent panel 204 is secured to the integral first stop and base plate 218 so that the insertion tab 23" is adjacent the setting block 240.

The first embodiment of the reinforced passageway 200 also includes a second stop 242 having an outside wall 244 of the second stop 242 that is secured to the top structural surface 210 and is also secured adjacent the top edge 214 of the second structural surface 208. The outside wall 244 of the second stop 242 extends in parallel association with and away from the second structural surface 208. The second stop 242 also includes an inside wall 246 of the second stop 242 that is also secured to the top structural surface 210 and is opposed to the outside wall 244. The inside wall 246 extends in parallel association with the outside wall 244 away from the top structural surface 210. FIG. 5 shows that the integral first stop and base plate 218 along with the second stop 242 are applied to descend upon the top structural surface 210 from above the surface 210, as represented in FIG. 5 by directional arrows 247. FIG. 6 and 7 show the integral first stop and base plate 218 along with the second stop 242 secured upon the top structural surface 210.

A second fastener 248 passes through a top surface 250 of the second stop 242 between the inside and outside walls 246, 244 of the second stop 242 and through the top structural surface 210 of the frame 202 to secure the second stop 242 to the top structural surface 210 of the frame 202. A second layer of glazing tape 252 (shown only in FIG. 7) is secured to an upper portion 254 of the inside wall 246 of the second stop 242. The second layer of glazing tape 252 extends along the inside wall 246 of the second stop 242 adjacent the transparent panel 204, and the tape 252 extends along the inside wall 246 of the second stop 242 to cover the upper portion 254 of the inside wall 246 of the second stop 242. The first layer 236 and second layer 252 of glazing tape cooperate to prevent the optically-transparent panel 204 from contacting metal material forming the first and second stops 220, 242.

In an additional aspect of the first reinforced passageway 200, the insertion tab 23" extends away from the common perimeter edge 11" a distance of about one-sixteenth of an inch (1/16"). The inventors herein experimented with shorter and longer insertion tabs (not shown), and determined that the one-sixteenth of an inch insertion tab 23" produced the greatest shatter resistance of the optically-transparent panel 204 of the first reinforced passageway 200.

In another aspect of the first reinforced passageway 200, the shatter-resistant, optically-transparent transparent panel 204 is configured so that an entire perimeter edge of the polycarbonate sheet 30" defines the insertion tab 23" so that the insertion tab 23" of the polycarbonate sheet 30" extends beyond the entire common perimeter edge 1".

In a further aspect of the first reinforced passageway 200, the outside wall 244 of the second stop 242 and the second structural surface 208 form part of an interior side 256 of the reinforced passageway 200. By "interior side 256" it is meant that the reinforced passageway 200 is part of an enclosed structure (not shown), such as a school building, having and "inside volume" enclosed by walls (not shown) , a roof (not shown) and passageways, etc. The "interior side 256" is a side 256 of the reinforced passageway 200 facing the inside volume (not shown) of the enclosed school building structure (not shown). Keeping the second fastener 248 of the second stop 242 in the interior side 256 of the enclosed structure (not shown) prevents an unwanted intruder (not shown) from unfastening the second stop (242) to mechanically remove the shatter proof, optically-transparent panel 204.

An additional embodiment of the present disclosure includes a second reinforced passageway that is shown in FIG. 8A in a fragmentary, cross-sectional view and is generally designated by the reference numeral 300. An entire second reinforced passageway (not shown) may be in the form of a door or a window, similar to the passageway 70 shown in FIG. 3. The second reinforced passageway 300 substantially improves two-piece kits (an exemplary two-piece kit being described in detail below) known in the art to secure transparent panels to a frame 72 of a passageway 70. Exemplary two-piece panel mounting kits are available from the CURRIES Company of Mason City, Iowa. (See: www.curries.com/Other/Curries/Documents/-tech door 9-10%202-9-09.pdf.)

The second reinforced passageway 300 includes a frame 302 surrounding a transparent panel 204. (For purposes of efficiency and avoiding redundant detail, the shatter-proof, optically-transparent panel 204 secured within the second reinforced passageway 300 shown in FIGS. 8A and 8B will be the same transparent panel 204 described above with respect to the first reinforced passageway 200.) The frame 302 includes a first structural surface 304, an opposed second structural surface 306 and a top structural surface 308 secured perpendicular to and extending between a first top edge 310 of the first structural surface 304 and a second top edge 312 of the second structural surface 306.

More particularly, the second reinforced passageway 300 includes, a first piece 314 of a two-piece transparent panel mounting kit 316. The first piece 314 has a first wall 318 secured adjacent the first top edge 310 of the first structural surface 304. The first wall 318 extends a pre-determined distance away from the first structural surface 304 and the top structural surface 308. The first wall 318 also includes a first cavity wall 320 extending back toward the top structural surface 308. The first wall 318 also includes a first grab-cleat 322 that extends below the first top edge 310 of the first structural surface 304 and is secured adjacent the first structural surface 304. The second reinforced passageway 300 also includes a second piece 324 of the two-piece transparent panel mounting kit 316. The second piece 324 has a second wall 326 secured adjacent the second top edge 312 of the second structural surface 306 and the second wall 326 extends a pre-determined distance away from the second structural surface 306 and the top structural surface 308. The second wall 326 also includes a second cavity wall 328 that extends toward the top structural surface. The second wall also includes a second grab-cleat 330 that extends below the second top edge 312 of the second structural surface 306 and is secured adjacent the second structural surface 306.

As shown in FIG. 8A, the first cavity wall 320 and the second cavity wall 328 are configured to define a panel mounting cavity 332 between the first and second cavity walls 320, 328. A bead of blast proof caulking 334 is secured within the mounting cavity 332 between the cavity walls 320, 328 and adjacent a lower portion 336 of the first cavity wall 320 and a lower portion 337 of the second cavity wall 328. A first layer of glazing tape 338 is secured along an upper portion 340 of the first cavity wall 320. A second layer of glazing tape 342 is secured along an upper portion 344 of the second cavity wall 328.

The optically-transparent panel 240 is secured within the mounting cavity 332, within the bead of blast proof caulking 334 the mounting cavity 332, and between and adjacent first and second layers of glazing tape 338, 342 on the first and second cavity walls 320, 328. The optically-transparent panel 204 is a shatter-resistant five-layer thin panel 10, 204 or a shatter-resistant seven-layer thick panel 60 described above. The transparent panel 204 has a weight no greater than about 4.6 pounds per square foot. The polycarbonate sheet 30" defines an insertion tab 23" extending beyond a common perimeter edge 11" of the non-polycarbonate sheets, as described above with respect to FIG. 7.

The optically-transparent panel 204 is secured within the mounting cavity 332 so that the insertion tab 23" is closer to the top structural surface 308 than the common perimeter edge 11". A kit-fastener 346 passes through the first and second pieces 314, 324 of the two-piece transparent panel mounting kit 316. The kit-fastener 346 and the two pieces 314, 324 of the kit 316 are configured so that the kit-fastener 346 selectively draws the two pieces 314, 324 toward each other to thereby decrease a volume within the mounting cavity 332 to secure the optically-transparent panel 204 within the mounting cavity 332 of the two-piece kit 316.

In another aspect of the second reinforced passageway 30, the insertion tab 23" extends away from the common perimeter edge 11" a distance of about one-sixteenth of an inch, as represented by reference numeral 348 in FIG. 8B.

In an additional aspect of the second reinforced passageway 300, an entire perimeter edge 23" of the polycarbonate sheet 30" defines the insertion tab 23" so that the insertion tab 23" of the polycarbonate sheet 30" extends beyond the entire common perimeter edge 11".

In a further aspect of the second reinforced passageway 300, the kit-fastener 346 comprises a metal screw having a driving head 350 and a threaded body 352 wherein the driving head 350 is secured adjacent one of the first piece 314 and the second piece 324 of the two-piece kit 316. The piece 314, 324 with the driving head 350 of the kit-fastener 344 forms part of an interior side 354 of the second reinforced passageway 300. In FIG. 8A, the interior side 354 therefore would include the first piece 314 of the kit 316.

Testing by the inventors has established an enormous increase in shatter-resistance of the described panels 10, 60, 204 that provides dramatically enhanced security for persons (not shown) within an interior of a building (not shown) protected by the reinforced passageways 200, 300, such as doors and windows that a retrofitted with the thin 10 or thick 60 panels within the first or second reinforced passageways 200, 300 embodiments of the present disclosure. Prior efforts to obtain anywhere near the same level of intrusion resistance necessarily included complete removal of the passageway frame and replacement with a frame that can support bullet-proof or intrusion resistant glass weighing typically more than 25 pounds per square foot, which is a very costly and time-consuming undertaking. In contrast, the panels 10, 60, 204 of the present first and second reinforced passageways 200, 300 weigh between about 4.1 pounds and 4.6 pounds per square foot, and hence can be easily supported by a standard door passageway frame 72 configured to support one-quarter inch, standard tempered glass panels (not shown) commonly utilized in public school buildings.

It is noted that all of the embodiments 10, 60, 200, 300 of the present disclosure include an insertion tab 23, 61, 23" extending beyond the perimeter edge 11, 11" of the panels. The inventors have experimented with the panels with and without the insertion tab 23, 61, 23". They have determined that when the panels 10, 60, 204 are secured within the first and/or second reinforced passageway embodiments 200, 300, the panels with the insertion tab 23, 61, 23" perform dramatically better than the panels within the reinforced passageways 200, 300 with no insertion tab 23, 61, 23". As noted above, the inventors have also undertaken experiments to determine an optimal length of the insertion tab 23, 61, 23", which is about one-sixteenth of an inch, as shown in FIG. 8B at reference numeral 348.

The inventors have proposed a reason that the insertion tab 23, 61, 23" produces such dramatically enhanced characteristics. First, the panels 10, 60, 204 are secured in both the first and second reinforced passageway embodiments 200, 300 so that the panels 10, 60, 204 do not contact any adjacent metal, and instead are only contacted by the bead blast-proof caulking 232, 334 and the strips of compressible glazing tape 236, 252, 338, 342. Therefore, whenever the panels 10, 60, 204 receive an impact, a vibration is initiated. The insertion tab 23, 61, 23" facilitates limited movement of the tap 23, 61, 23" within the bead of blast-proof caulking 232, 334 that effectively dampens and diffuses the vibration to decrease the probability of any damage to the panels 10, 60, 204 at the location of the panels being secured within the passageway frame 70. This limited movement of the invention tab 23, 61, 23" is permitted while the panels 10, 60, 204 are firmly secured adjacent the top structural surface 210, 308 of the frame 202, 302 and protected against contact with any metal stops 220, 242 or metal cavity walls 320, 328 by the unique use of the strips of compressible glazing tape 236, 252, 338, 342 and the bead of blast-proof caulking 232, 334.

Production of the thin embodiment 10, 204 and the thick embodiment 60, involve assembly of the embodiments 10, 60 within heated vacuum chambers (not shown) under conditions that are known in the production of prior art multi-layered, intrusion resistant, optically-transparent panels (not shown).

For purposes herein, the word "about" is to mean plus or minus twenty-percent. Additionally, the word "thickness" is to mean a shortest distance between opposed surfaces or the described object.

While the present disclosure has been presented above with respect to the described and illustrated embodiments of the shatter-resistant, optically-transparent panels 10, 60, 204 and methods of use of the panels for on-site retrofitting to produce reinforced passageways 200, 300, it is to be understood that the disclosure is not to be limited to those alternatives and described embodiments. Accordingly, reference should be made primarily to the following claims rather than the forgoing description to determine the scope of the disclosure.

What is claimed is:

1. A reinforced passageway supporting a shatter-resistant, optically-transparent panel, the passageway including a frame surrounding the transparent panel, the frame including a first structural surface, an opposed second structural surface and a top structural surface secured perpendicular to and extending between top edges of the first and second structural surfaces, the reinforced passageway comprising:
   a. an integral first stop and base plate that includes a box shaped first stop having a base plate as a base of the first stop and extending away from the first stop, the base plate being secured adjacent to and parallel with the top structural surface, an outside wall of the first stop being secured to the base plate and adjacent the top edge of the first structural surface and extending away from the first structural surface and top structural surface, an inside wall of the first stop secured to the base plate opposed to the outside wall and extending away from the base plate and top structural surface, the base plate including a plate extension extending along the top structural surface in a direction away from the outside and inside walls, and a first fastener passing through the base plate extension to fasten the integral first stop and base plate to the top structural surface;
   b. a bead of blast proof caulking secured over the first fastener between and along the base plate extension and a lower portion of the inside wall of the first stop;
   c. a first layer of glazing tape secured to an upper portion of the inside wall extending from adjacent the bead of blast proof caulking along the inside wall parallel to the bead and extending to cover the upper portion of the inside wall;
   d. a setting block secured within the bead of blast proof caulking and adjacent the base plate extension;
   e. the optically-transparent panel secured within the bead of blast proof caulking upon the setting block and adjacent the first layer of glazing tape, the optically-transparent panel being one of a shatter-resistant five-layer thin panel and a shatter-resistant seven-layer thick panel, each of the panels including opposed first and second glass sheets, first and second urethane sheets between the first and second glass sheets, and a polycarbonate sheet between the urethane sheets, wherein the transparent panel has a weight no greater than about 4.6 pounds per square foot, and wherein the polycarbonate sheet defines an insertion tab extending beyond a common perimeter edge defined by the glass sheets and the urethane sheets overlying each other, the optically-transparent panel secured to the integral first stop and base plate so that the insertion tab is adjacent the setting block;
   f. a second stop including an outside wall of the second stop secured to the top structural surface and adjacent the top edge of the second structural surface and extending away from the second structural surface and top structural surface, an inside wall of the second stop secured to the top structural surface opposed to the outside wall and extending away from the top structural surface, and a second fastener passing through a top surface of the second stop between the inside and outside walls of the second stop and through the top structural surface of the frame to secure the second stop to the top structural surface of the frame; and,
   g. a second layer of glazing tape secured to an upper portion of the inside wall of the second stop and extending adjacent the transparent panel and along the inside wall of the second stop to cover the upper portion of the inside walls of the second stop.

2. The reinforced passageway of claim 1, wherein the insertion tab extends away from the common perimeter edge a distance of about one-sixteenth of an inch.

3. The shatter-resistant, optically-transparent panel of claim 1, wherein an entire perimeter edge of the polycarbonate sheet defines the insertion tab so that the insertion tab of the polycarbonate sheet extends beyond all of the common perimeter edge.

4. The reinforced passageway of claim 1, wherein the outside wall of the second stop and the second structural surface form part of an interior side of the reinforced passageway.

5. A reinforced passageway supporting a shatter-resistant, optically-transparent panel, the passageway including a frame surrounding the transparent panel, the frame including a first structural surface, an opposed second structural surface and a top structural surface secured perpendicular to and extending between top edges of the first and second structural surfaces, the reinforced passageway comprising:
   a. a first piece of a two-piece transparent panel mounting kit, the first piece having a first wall secured adjacent the top edge of the first structural surface and the first wall extending a pre-determined distance away from the first structural surface and the top structural surface, the first wall also including a first grab-cleat extending below the top edge of the first structural surface and adjacent the first structural surface;
   b. a second piece of the two-piece transparent panel mounting kit, the second piece having a second wall secured adjacent the top edge of the second structural surface and the second wall extending a pre-determined distance away from the second structural surface and the top structural surface and the second wall also including a second cavity wall extending toward the top structural surface, the second wall also including a second grab-cleat extending below the top edge of the second structural surface and adjacent the second structural surface;
   c. the first cavity wall and the second cavity wall configured to define a panel mounting cavity between the walls;
   d. a bead of blast proof caulking secured within the mounting cavity between the cavity walls and adjacent lower portions of the first and second cavity walls;
   e. a first layer of glazing tape secured along an upper portion of the first cavity wall and a second layer of glazing tape secured along an upper portion of the second cavity wall; and,
   f. the optically-transparent panel secured within the mounting cavity and within the bead of blast proof caulking and between and adjacent the first and second layers of glazing tape on the first and second cavity walls, the optically-transparent panel being one of a shatter-resistant five-layer thin panel and a shatter-resistant seven-layer thick panel, each of the panels including opposed first and second glass sheets, first and second urethane sheets between the first and second glass sheets, and a polycarbonate sheet between the urethane sheets, wherein the transparent panel has a weight no greater than about 4.6 pounds per square foot, and wherein the polycarbonate sheet defines an insertion tab extending beyond a common perimeter edge defined by the glass sheets and the urethane sheets overlying each other, the optically-transparent panel secured within the mounting cavity so that the insertion tab is closer to the top structural surface than the common perimeter edge; and,
   g. a kit-fastener passing through the first and second pieces of the two-piece transparent panel mounting kit and configured so that the kit-fastener selectively draws the two pieces toward each other to thereby decrease a volume within the mounting cavity to secure the optically-transparent panel within the mounting cavity of the two-piece kit.

6. The reinforced passageway of claim 5, wherein the insertion tab extends away from the common perimeter edge a distance of about one-sixteenth of an inch.

7. The shatter-resistant, optically-transparent panel of claim 5, wherein an entire perimeter edge of the polycarbonate sheet defines the insertion tab so that the insertion tab of the polycarbonate sheet extends beyond all of the common perimeter edge.

8. The reinforced passageway of claim 5, wherein the kit-fastener comprises a metal screw having a driving head and threaded body wherein driving head is secured adjacent one of the first and second pieces of the two-piece kit, and the piece with the driving head of the metal screw forms part of an interior side of the reinforced passageway.

* * * * *